US007972639B2

(12) United States Patent
Guerrero et al.

(10) Patent No.: US 7,972,639 B2
(45) **Date of Patent: *Jul. 5, 2011**

(54) BEVERAGE DISPENSER WITH ADDITIVE DISPENSING

(75) Inventors: Arturo F. Guerrero, Warren, CT (US); David Harrison, New Milford, CT (US)

(73) Assignee: Nestec S.A., Vevey (CH)

( * ) Notice: Subject to any disclaimer, the term of this patent is extended or adjusted under 35 U.S.C. 154(b) by 944 days.

This patent is subject to a terminal disclaimer.

(21) Appl. No.: 11/720,253

(22) PCT Filed: Nov. 29, 2005

(86) PCT No.: PCT/EP2005/012724

§ 371 (c)(1), (2), (4) Date: May 25, 2007

(87) PCT Pub. No.: WO2006/058692

PCT Pub. Date: Jun. 8, 2006

(65) Prior Publication Data

US 2008/0206429 A1 Aug. 28, 2008

(51) Int. Cl.
*A23F 3/00* (2006.01)

(52) U.S. Cl. ........ 426/232; 426/593; 426/594; 426/597; 426/599; 426/519; 222/129.4

(58) Field of Classification Search .................. 426/231, 426/232, 590–599, 519; 222/129.1–129.4, 222/146.2
See application file for complete search history.

(56) References Cited

U.S. PATENT DOCUMENTS

| | | | | | |
|---|---|---|---|---|---|
| 4,211,342 | A | * | 7/1980 | Jamgochian et al. | 222/129.4 |
| 4,748,028 | A | * | 5/1988 | McKenna et al. | 426/130 |
| 4,748,033 | A | * | 5/1988 | Syfert et al. | 426/330.3 |
| 4,753,370 | A | | 6/1988 | Rudick et al. | |
| 4,953,751 | A | * | 9/1990 | Shannon | 222/14 |
| 5,332,123 | A | * | 7/1994 | Farber et al. | 222/129.4 |
| 5,758,571 | A | | 6/1998 | Kateman et al. | |
| 5,803,320 | A | * | 9/1998 | Cutting et al. | 222/641 |
| 5,960,997 | A | | 10/1999 | Forsythe et al. | |
| 6,129,943 | A | * | 10/2000 | Zeller et al. | 426/564 |
| 6,240,829 | B1 | * | 6/2001 | McGarrah | 99/275 |
| 6,274,187 | B1 | * | 8/2001 | Lehmberg et al. | 426/435 |
| 6,419,120 | B1 | | 7/2002 | Bertone | |
| 6,460,735 | B1 | * | 10/2002 | Greenwald et al. | 222/146.1 |
| 6,544,576 | B2 | * | 4/2003 | Zeller et al. | 426/594 |
| 6,792,847 | B2 | * | 9/2004 | Tobin et al. | 99/275 |
| 6,874,660 | B2 | * | 4/2005 | Bertone | 222/129.4 |
| 7,147,131 | B2 | * | 12/2006 | Sher et al. | 222/1 |
| 2004/0086620 | A1 | * | 5/2004 | Tobin et al. | 426/597 |
| 2004/0129720 | A1 | | 7/2004 | Cheng et al. | |

FOREIGN PATENT DOCUMENTS

EP 0 476 950 3/1992

* cited by examiner

*Primary Examiner* — Drew E Becker
(74) *Attorney, Agent, or Firm* — K&L Gates LLP

(57) ABSTRACT

Beverage dispensers and dispensing methods that facilitate mixing of one or more additives (e.g., flavorings) with a base liquid are described. In a preferred method of preparing a beverage, a base liquid is dispensed from a dispensing device (100) into a container (150). A flowable additive is dispensed from the dispensing device into the container to mix the flowable additive with the base liquid during the dispensing of the base liquid to provide the beverage. Preferably, the dispensing of the base liquid and the flowable additive is controlled to vary the relative concentration of the additive in the base liquid in the container during the dispensing.

23 Claims, 3 Drawing Sheets

BEVERAGE DISPENSER WITH ADDITIVE DISPENSING

The present invention relates to dispensing beverages. More specifically, the present invention relates to preparing beverages with a base liquid and selected additive(s).

A beverage dispenser is a device that prepares a beverage from one or more beverage sources. In some types of beverage dispensers, beverage sources that include concentrates and/or powders are mixed with a liquid (e.g., water) to prepare the beverage. Some types of dispensers dispense relatively cold beverages (e.g., soft drinks), requiring concentrates, while other types of dispensers dispense relatively hot beverages (e.g., coffees, teas, and hot chocolates), such as using powders.

A traditional cold-beverage dispenser is disclosed in U.S. Pat. No. 5,960,997. The dispenser dispenses a base beverage, such as a soft drink syrup, and an agent for diluting that syrup into a cup. The dispenser also dispenses a flavoring into the cup simultaneously with and throughout the dispensing of the base beverage so as to maintain a constant ratio between the volume of the base beverage and the volume of the flavoring. While keeping the ratio constant, this results in a less than ideal mixing.

A traditional hot-beverage dispenser is disclosed in U.S. Pat. No. 6,419,120. This dispenser has multiple flavoring dispensers and prepares a flavored beverage by dispensing a base powder, water, and one or more of the flavorings into a cup.

When powders are mixed to provide a beverage, solids can remain that bind to the flavorings. When flavors are added, they can bind to remaining solids, producing flavor concentrations and unevenness when the concentration of solids is high. When producing cold beverages, powder is especially hard to dissolve sufficiently to avoid the presence of a large solid concentration. A dispenser and a dispensing method are therefore needed to provide improved mixing of an additive with a base liquid during preparation of a flavored beverage.

The present invention relates to beverage dispensers and dispensing methods that provide improved mixing of one or more additives (e.g., flavorings) with a base liquid. For instance, by varying the dispensed proportion of the additive, the mixing is improved as the base is dispensed. Varying the ratio of additive to base liquid is especially advantageous, for example, when the ratio is varied during the beverage dispensing, preferably with a reduced ratio of additive to base, at one or both of the beginning and end of the beverage dispensing.

The reduction of the ratio of additive-to-base at the beginning of the beverage dispensing ensures that there is no or at least a reduced amount of additive that can stick to the wall of the recipient and get improperly mixed and also ensures that there is always enough liquid and turbulence provided by the base for properly mixing (e.g. diluting by dilution or dispersion) the additive with said base.

The reduction of the ratio of additive-to-base at the end of the beverage dispensing also ensures that there is no or at least a reduced amount of additive which could settle on the top of the beverage without being mixed which could provide a nasty taste to the beverage.

A dispenser constructed according to the invention can deliver a very elevated level of flavor mixing, whether the beverage is hot or cold.

In a preferred method of preparing a beverage, a base liquid is dispensed from a dispensing device into a container. A flowable additive is dispensed from the dispensing device into the container to mix the flowable additive with the base liquid during the dispensing of the base liquid to provide the beverage. Preferably, the dispensing of the base liquid and the flowable additive is controlled to vary the relative concentration of the additive in the base liquid in the container during the dispensing.

In a preferred embodiment, the dispensing of the additive is commenced after commencing the dispensing of the base liquid. For example, in one such embodiment, the dispensing of the base liquid is commenced at least about 1 second before commencing the dispensing of the additive. The dispensing of the base liquid can be stopped at the same time as or later than, but preferably not earlier than, the stopping of the dispensing of the flowable additive.

The dispensing of the base liquid is preferably stopped after the dispensing of the flowable additive is stopped for varying the additive concentration in the base liquid after the additive dispensing is stopped. For example, the dispensing of the base liquid can be stopped after a stopping time period after stopping the dispensing of the additive, in which the stopping time period is proportional to the duration of the additive dispensing.

The dispensing of the base liquid and the additive can be controlled by operating a dispensing control. For example, the base liquid and the additive can be dispensed for predetermined time periods in response to operation of the dispensing control. Also for example, the base liquid can be automatically dispensed for a predetermined period longer than the additive after operation of the dispensing control.

The additive is preferably dispensed during the dispensing of the base liquid to mix with the base liquid. The additive can be mixed in the base liquid in a relative concentration typically between 1:1000 to 1:25 volume of additive to base liquid. The additive can include one or more of: a flavoring, a nutritional supplement, a coffee or tea boost, a sweetener, a flavor enhancer or reducer, a colorant, an aromatic, and a substance selected for adding body to the base liquid.

Also, the additive can be dispensed in a plurality of pulses of predetermined durations. Preferably, the base liquid is dispensed at least before the beginning of the pulses, and is preferably also being dispensed when the pulses begin. The base liquid is also preferably dispensed after the stopping of the pulses. The series of pulses can be initiated and/or stopped based on operation of the dispensing control.

In one aspect, the additive is dispensed during a period which increases relative to the volume of the beverage base to be dispensed. This guarantees that the beverage remains properly dosed with a constant concentration of additive(s) whatever the size of the beverage is dispensed.

In another aspect, the strength or concentration of the additive in the beverage can be selected according to choice made by the user. Therefore, the additive dispensing time can be varied (e.g., increased) as a function of the selected concentration or strength (e.g., when a stronger additive concentration is desired).

More specifically, the additive can be dispensed following the steps of:

a—Obtaining preference information from a dispensing control of the dispensing device relative to a desired size "V" of the beverage among a choice of different sizes of beverages, b—Optionally, obtaining preference information from a dispensing control of the dispensing device relative to the desired additive strength "X" for one size among a choice of additive strengths (e.g., low, medium, high) and, c—Controlling the dispensing device to dispense the additive during an additive dispensing cycle time "Y" in a manner which is relative (e.g., proportional) to the size of the beverage and, optionally, also corresponds to the chosen strength "X".

It must be noted that the steps a- and b- may take place simultaneously or sequentially in any possible order.

The dispensing control(s) for the preference information may comprise a user interface of any suitable type. The user interface may be a switchboard, a touch screen, a portable computer or phone or any other equivalent means. The preference information may actually be stored in a storage media of a controller linked to the user interface that includes the instructions for causing the controller to activate the dispensing of the additive.

The additive is preferably dispensed from fewer than all of a plurality of additive sources to make a single beverage. The additive sources can themselves be selected based on operation of a selection control of the dispensing device.

The base liquid is preferably prepared in the dispensing device by mixing a beverage component with a first liquid. The beverage component can comprise a protein-enriched liquid, juice, coffee, tea, cocoa, a milk-based liquid, a cereal, or a combination thereof. In one embodiment, the beverage component includes one or more of: a coffee or cocoa base, a sweetener, and a whitener (e.g., a non-dairy creamer or a dairy creamer with real-milk solids). The beverage component and the first liquid can be whipped to produce a foam layer on a liquid layer in the dispensed base liquid. The final dispensed amount of the additive can be mixed with the base liquid.

In another embodiment of a method of preparing a beverage, a base liquid is dispensed from a dispensing device into a container. A flowable additive is automatically dispensed from the dispensing device into the container in a plurality of pulses of predetermined durations to mix the flowable additive with the base liquid during the dispensing of the base liquid. The pulses preferably begin after the base liquid dispensing is begun and end up substantially to when the dispensing of the base liquid is stopped.

In one mode of the method of the invention, the beverage is dispensed in response to a user actuating a button on free flow basis. For this, the dispensing of the beverage may be controlled by the following sequence:

a—Starting the dispense of the beverage base at a starting time T=0, b—Starting pulsing the additive at a time delay A in second from the starting time T=0 corresponding to formula:

$$A=v/(V/Z)$$

where volume "v" is a minimum volume of beverage base needed before pulsing the additive, V is the actual beverage volume and Z is the total dispensing time for the beverage in seconds, c—Pulsing the additive at every time interval corresponding to the formula:

$$\text{Time interval}=(Z-2.A)/n;$$

where n is total number of pulses necessary for delivering X mL of additive in the beverage obtained by the formula:

$$n=X/q$$

where q is the quantity of additive delivered by the additive dosing device per pulse, d—Optionally, pulsing a last pulse of additive at a time delay obtained by the formula:

$$T=(Z-A)\text{(in seconds)},$$

e—Ending dispensing of the beverage base at a time delay of T=Z.

In a preferred method of preparing a non-carbonated beverage, a base liquid is prepared in a dispensing device by mixing a beverage component with a first liquid. The base liquid is dispensed from the dispensing device into a container through a base liquid nozzle. A flowable additive is dispensed from the dispensing device into the container through an additive nozzle during the dispensing of the base liquid to mix with the base liquid. The base liquid and additive nozzles are preferably arranged in spaced relation to prevent cross-contamination of the sprayed base liquid and sprayed additive.

A preferred beverage dispensing device includes a base liquid source, an additive source, a base liquid dispensing mechanism, an additive dispensing mechanism, and a controller. The base liquid dispensing mechanism is operably associated with the base liquid source for dispensing a base liquid into a container, and the additive dispensing mechanism is operably associated with the additive source for dispensing a flowable additive into the container. The controller is associated with the dispensing mechanisms to vary the relative concentration of the additive in the base liquid in the container during the dispensing. The dispensing mechanisms are configured such that the flowable additive is mixed with the base liquid to provide a beverage during the dispensing of the base liquid. The beverage dispensing device can also include a heater that is configured for heating the base liquid to provide a warm or hot beverage and/or a cooler for cooling the base liquid to provide a chilled beverage.

The controller is preferably configured for causing the additive dispensing mechanism to start dispensing the additive after and in response to the start of the base liquid dispensing by the base dispensing mechanism. Also, the controller is preferably configured for causing the base dispensing mechanism to continue dispensing the base liquid for a predetermined time period after the dispensing of the additive by the additive dispensing mechanism is stopped. The controller can be configured for causing the additive dispensing mechanism to dispense the additive in pulses of a predetermined duration.

The additive dispensing mechanism can include a pumping mechanism that is associated with the additive source for pumping the additive from the additive source into the container.

Another preferred beverage dispensing device includes a first liquid source, a beverage component source, and a blending system. The blending system is operably associated with the first liquid and beverage component sources for receiving and blending a first liquid and a beverage component from the sources to prepare the base liquid.

These and other features of the disclosed beverage dispensers and dispensing methods can be more fully understood by referring to the following detailed description and accompanying drawings. The drawings are not drawn to scale, but show only relative dimensions.

Figure 1:
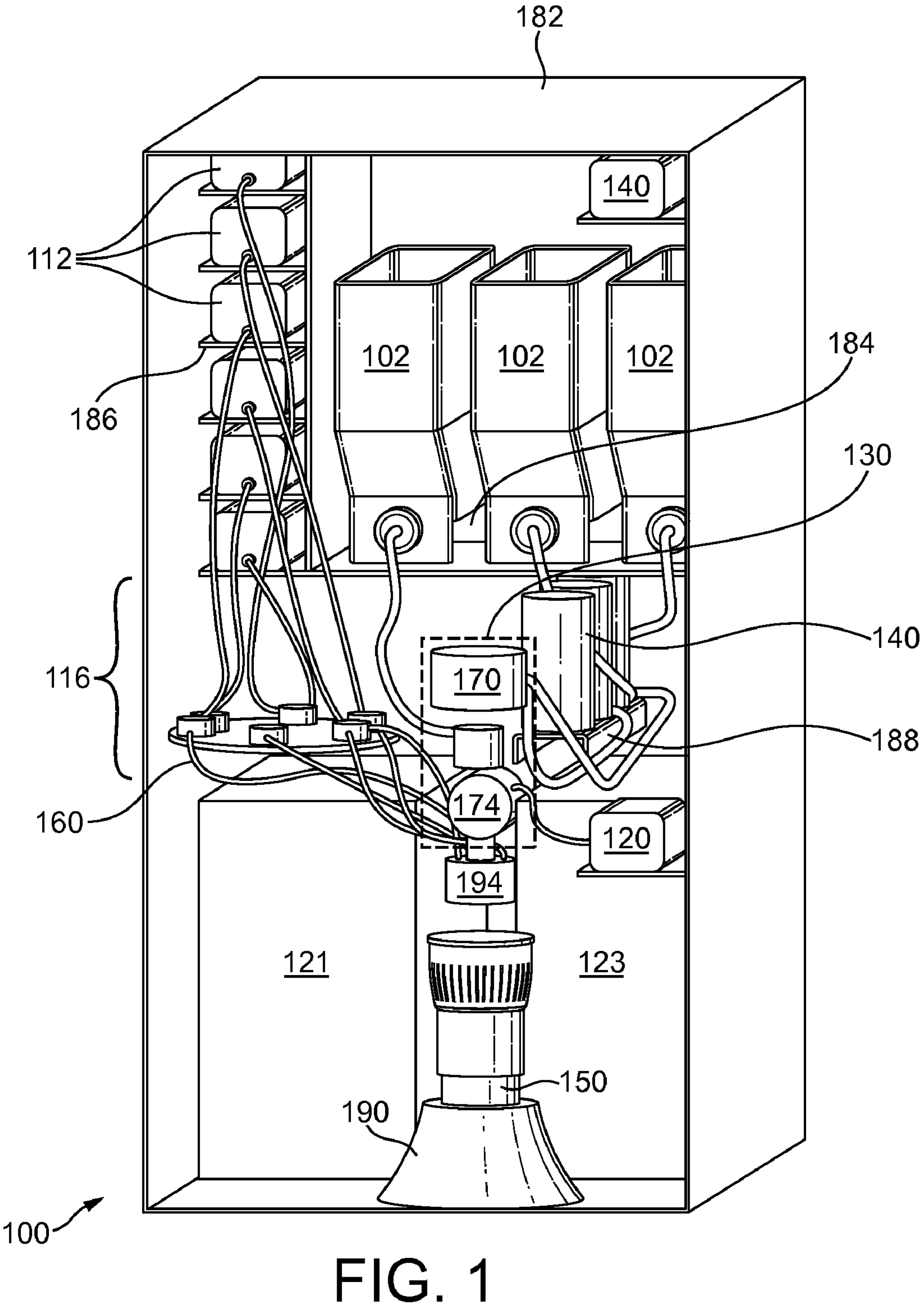
FIG. 1 is a front perspective view of an embodiment of a beverage dispenser.

Illustrative embodiments will now be described to provide an overall understanding of the disclosed beverage dispensers and dispensing methods. One or more examples of the illustrative embodiments are shown in the drawings. Those of ordinary skill in the art will understand that the disclosed dispensers and dispensing methods can be adapted and modified to provide dispensers and dispensing methods for other applications, and that other additions and modifications can be made to the disclosed beverage dispensers and dispensing methods without departing from the scope of the present disclosure. For example, features of the illustrative embodiments can be combined, separated, interchanged, and/or rearranged to generate other embodiments. Such modifications and variations are intended to be included within the scope of the present disclosure.

As shown in FIG. 1, the dispenser 100 of a preferred embodiment includes base storage chambers 102 that store beverage components and that are in fluid communication with a base-liquid dispensing mechanism 106. Additive containers 112 store additives and are in fluid communication with an additive dispensing mechanism 116. A blending mechanism 130 is provided in fluid communication with the dispensing mechanisms 106 and 116 and with a liquid source 120. Dispenser 100 also includes a controller 145 that is operatively connected to the dispensing mechanisms 106 and 116, the liquid source 120, and the blending mechanism 130.

Dispenser 100 can also include a variety of structural features whose functions are well known to those of ordinary skill in the art. For example, dispenser 100 can include a housing 182; shelves 184, 186, 188 that are attached to the housing 182 and that support storage chambers 102, containers 112, and other components; a container 150 for receiving the dispensed flavored beverage; and a drip pan or drain 190 for collecting overflow or spillage from the container 150.

Dispenser 100 is preferably configured to prepare a variety of beverages, including relatively hot and relatively cold beverages. Some embodiments are configured for dispensing relatively hot or relatively cold beverages, but not both.

As further described below, during operation of dispenser 100, controller 145 preferably causes base-liquid dispensing mechanism 106 and additive dispensing mechanism 116 to dispense a base liquid (which is prepared from the beverage components stored in chambers 102) and one or more additives into container 150. Generally, during such operation, controller 145 controls the dispensing of the base liquid and the additives so as to vary the concentration of the dispensed additives in the dispensed base liquid as the base liquid is being dispensed.

In the embodiment shown in FIG. 1, base-liquid dispensing mechanism 106 includes component delivery mechanisms, such as pumps 140, that are fluidly connected by conduits (e.g., tubing and plugs) to the storage chambers 102 for delivering beverage components from those chambers to the blending mechanism 130. The storage chambers 102 can store a variety of beverage components, such as, but not limited to, concentrates, liquids, syrups, and/or combinations thereof that can be used to prepare a beverage suitable for human consumption. For example, the storage chambers 102 can store a beverage component that includes a base for cocoa, coffee, hot chocolate, and/or tea; a sweetener (e.g., sugar or an artificial sweetener); and/or a whitener (e.g., a dairy or non-dairy creamer). As used herein, the term concentrate refers to fluid concentrates, such as liquid concentrates. Preferably, the base component is not a powder. Thus, the mechanisms to handle the concentrates, such as the component delivery mechanism, include mechanisms that are configured for handling fluid concentrates instead of powders. Pumps can be used instead of augers, for instance. Preferably, base-liquid dispensing mechanism 106 includes dosing systems, such as separate pumps 140 for each different storage chamber 102 to prevent or inhibit cross-contamination between different beverage components stored in the storage chambers 102.

In the embodiment shown in FIG. 1, the additive dispensing mechanism 116 includes pumps 160 that are connected to the containers 112 for delivering additives from those containers to the blending mechanism 130. The containers 112 can store a variety of additives, such as, but not limited to, concentrates, liquids, emulsions, and syrups. For example, the containers 112 can store flavorings (e.g., vanilla extract), nutritional supplements (e.g., vitamin and/or minerals, whey or bran, or substances recognized to improve mental and body well being), coffee or tea boosts, sweeteners, whiteners, flavor enhancers, flavor reducers, colorants, aromatics, substances for adding body to base liquids (e.g., substances capable of forming foams), and/or combinations of the foregoing. Preferably, additive dispensing mechanism 116 includes a separate pump 160 for each different container 112 to prevent or inhibit cross-contamination between different additives stored in the containers 112.

A variety of pumping mechanisms that are well known to those of ordinary skill in the art, such as peristaltic pumps, piston pumps, and diaphragm pumps, can be used in base-liquid dispensing mechanism 106 and in additive dispensing mechanism 116 to deliver the beverage components from storage chambers 102 and the additives from containers 116 to the blending mechanism 130. Preferably, pumps 140 and 160 are capable of providing liquid streams, such as liquid jets.

The base-liquid dispensing mechanism 106 of the preferred embodiment is also associated with the liquid source 120, which provides a liquid that can be blended in blending mechanism 130 with one or more beverage components and/or one or more beverages to provide a base liquid. Usually, liquid or diluent source 120 is a source of potable water at ambient temperature and is connected to a valve and/or a pump of the base-dispensing mechanism 106 that is controlled by the controller 145. As shown in FIG. 1, liquid source 120 can be in fluid communication with a heating unit 121 (e.g., a boiler) and/or a cooling unit 123 (e.g., a refrigeration unit) that are operatively connected to controller 145 and that are controlled thereby to provide relatively hot or relatively cold water to blending mechanism 130. In one embodiment, however, the liquid source includes a dedicated source of hot water, a dedicated source of cold water, or both (such as dedicated sources external to dispenser 100), and which can be full of heating and/or cooling units. In some embodiments, the liquid source 120 is a source of liquid other than water at ambient temperature such as, but not limited to, carbonated water, cream, juice, or milk.

Figure 2:
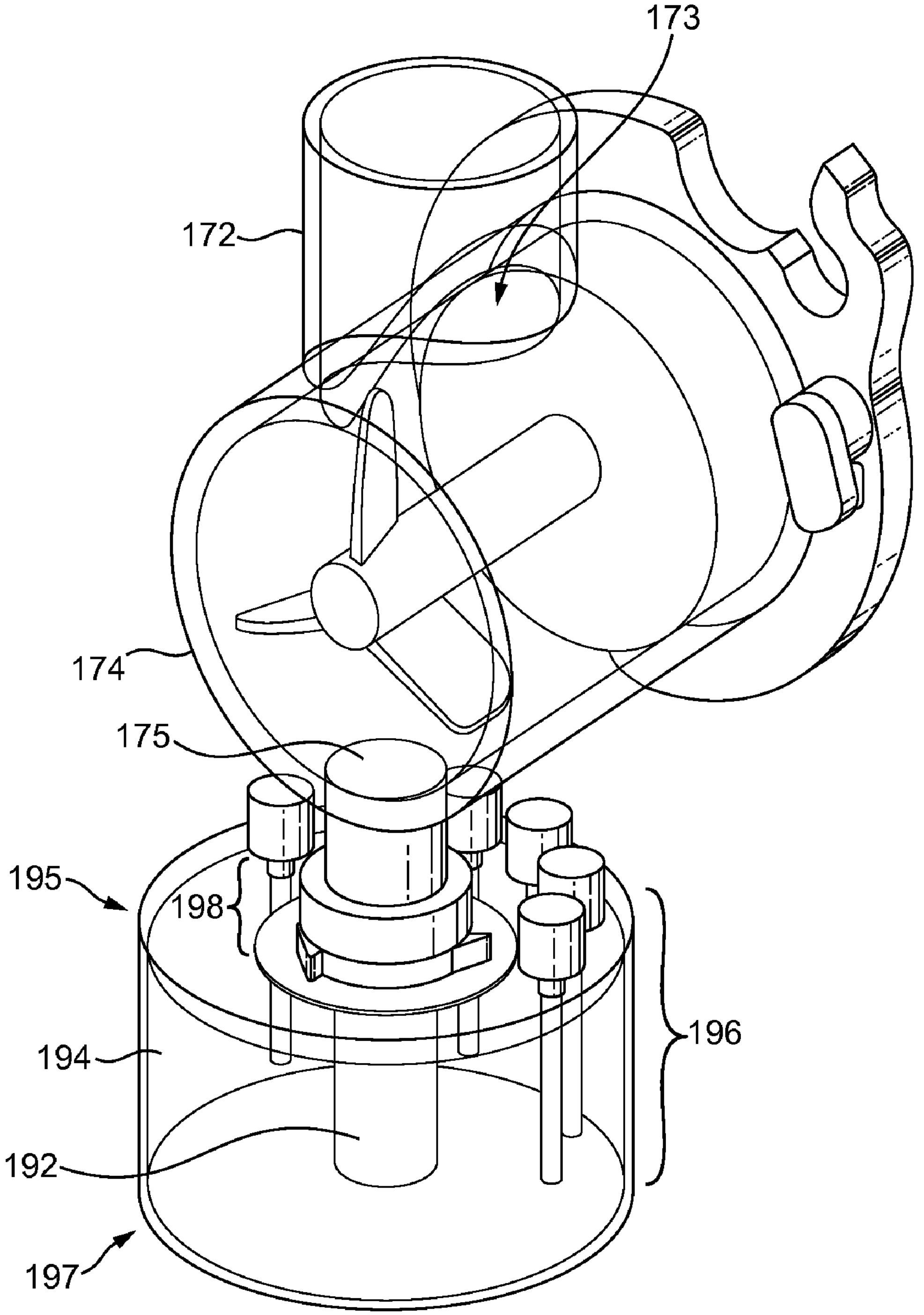
FIG. 2 is a perspective view of the blending mechanism in the embodiment of the beverage dispenser of FIG. 1; and, FIG. 3 schematically illustrates an embodiment of a method for preparing a beverage with the dispenser of FIGS. 1 and 2.

Referring to FIGS. 1 and 2, blending mechanism 130 includes a mixing cup 170 that is preferably configured as a funnel and is fluidly connected via a conduit 172 to a whipping chamber 174 that has an inlet port 173 and an outlet port 175. The mixing cup 170 is in fluid communication with pumps 140 and liquid source 120 for receiving the beverage components and liquid therefrom. The whipping chamber 174 preferably includes a whipper 176 that is operatively connected to controller 145 and that includes a whipper element, such as vanes or fins 177 of an impeller, for whipping the base liquid that passes from mixing cup 170 and into chamber 174 via conduit 172 and inlet port 173. A variety of whippers that are well known to those of ordinary skill in the art (e.g., disk-type and vane-type whippers) can be used as whipper 176 to whip the base liquid.

The blending mechanism 130 includes a base-liquid dispensing nozzle 192 in communication with the outlet port 175 of whipping chamber 174, a delivery guard 194 surrounding the dispensing nozzle 192, and one or more additive nozzles 196. The base dispensing nozzle 192 directs the base liquid that passes through the outlet 175 of the whipping chamber 174 into the container 150. The delivery guard 194, which can be attached to dispensing nozzle 192 via, among other things, a gasket and clamp assembly 198, prevents or inhibits the liquid being dispensed from dispenser 100 from splashing and/or projecting substantially outwards beyond the delivery region, i.e., the open end of the container 150. The additive nozzles 196 are in fluid communication with the pumps 160 and are disposed along the longitudinal axis of the dispensing nozzle 192 for dispensing additives into container 150. Within the delivery guard 194, nozzle 192 is separated from additive nozzles 196, and additive nozzles 196 are separated from each other to prevent or inhibit splashing and cross-contamination between the base liquid and the additives and among the additives during operation of dispenser 100.

In the shown embodiment, the delivery guard 194 includes a hollow cylindrically-shaped piece of plastic, metal, or other suitable material that has a closed end 195, an open end 197, and one or more apertures that are formed in the closed end 195 and spaced along an arc. The apertures are sized, shaped, and arranged such that, when additive nozzles 196 are disposed therein, the nozzles 196 are supported and are positioned to direct additives into container 150. Alternatively, the delivery guard 194 includes a solid cylindrically-shaped (or otherwise shaped) piece of material having one or more channels that are formed therethrough and that are sized, shaped, and arranged for conducting additives from pumps 160 to container 150. A variety of arrangements can be devised to achieve the protective and holding functions of the delivery guard 194. Suitable shapes for a guard include a full circle, semicircle, or another shape that fits the dispensing system.

As shown in FIG. 1, controller 145 is operatively connected to base-liquid dispensing mechanism 106 (e.g., pumps 140), additive dispensing mechanism 116 (e.g., pumps 160), liquid source 120 (and, in some embodiments, heating and cooling units 121 and 123), and blending mechanism 130 (e.g., whipper 176). Controller 145 is a processor-controlled device that is capable controlling the flow rates of and the timing of the dispensation of the beverage components, the additives, and the liquid. A variety of processor-controlled devices well known to those of ordinary skill in the art can be used as controller 145 to control the operations of dispenser 100 and its component mechanisms. Some of these devices include, but are not limited to, a programmable logic controller (PLC), a programmable timing device, a personal computer, a computer workstation, a laptop computer, a server computer, a mainframe computer, a handheld device (e.g., a personal digital assistant, a Pocket Personal Computer (PC), a cellular telephone, etc.), an information appliance, etc. As further described herein, in some embodiments, controller 145 is operatively connected to a user interface, e.g., a mouse, a keyboard, a touch sensitive screen, a track ball, a keypad, etc., so as to receive commands and/or other information from a user of the dispenser 100.

As previously described, during operation of dispenser 100, controller 145 controls the dispensing of base liquid and additive(s) so as to vary the concentration of the dispensed additive(s) in the dispensed base liquid during the dispensing of the base liquid. Preferably, controller 145 controls the dispensing so that dispenser (i) dispenses the base liquid and the additive(s), (ii) begins dispensing the additive(s) later than the dispensing of the base liquid, and (iii) finishes dispensing the additive(s) not later than finishing the dispensing of the base liquid. Dispensing the additive(s) in such a manner facilitates blending between the additive(s) and the base liquid by capitalizing upon the agitation that is naturally produced in the prepared beverage by the impact of the jet-type fluid streams being dispensed. In addition to facilitating blending, stopping the dispensing of the additive(s) not later than when the dispensation of the base liquid has stopped reduces waste by inhibiting splashing of the additive(s) from the surface of the prepared beverage.

Although jet-type streams or sprays are preferable for the additive, non-jet streams can also be used. Preferably, however, the streams are produced by forcing the stream out of a nozzle at elevated pressure. to facilitate mixing. Typical flow rates are around 0.25 fluid ounces per second (i.e., 7.1 grams per sec.) to about 10 fluid ounces per second (i.e., 283.5 grams per sec.), more typically between about 0.5 and 3 fluid ounces per second (i.e., respectively, 14.18 and 85.1 grams per sec.), with a preferred flow rate on the order of about 1 fluid ounce per second (i.e., 28.35 grams per sec.).

Generally, controller 145 communicates with one or more storage media that include instructions for causing controller 145 to prepare a flavored beverage. These instructions can include instructions for controlling pumps 140 and 160, heating and cooling units 121 and 123, and other components (such as the components shown in FIGS. 1-3) so as to generate and/or dispense a base liquid and/or one or more additives into container 150.

Usually, controller 145 receives a selection of a desired flavored beverage from a human operator or user of dispenser 100 via a user interface. For example, controller 145 can receive a selection by detecting a mouse click, a keyboard entry, a keypad entry, and/or another input event initiated by the user. In some embodiments, based on receiving that selection, controller 145 prepares the selected favorable beverage automatically. For example, in some of such embodiments, controller 145 dispenses the base liquid and the one or more additives according to the instructions in the storage media (e.g., instructions related to the timing and flow rates of the dispensing). Alternatively, in some embodiments, controller 145 prepares the beverage based on the instructions that are included in the storage media and the instructions that are received from a user during dispensation. For example, in some of such embodiments, controller 145 determines the timing at which one or more additives are dispensed into container 150 based on user inputs.

Figure 3:
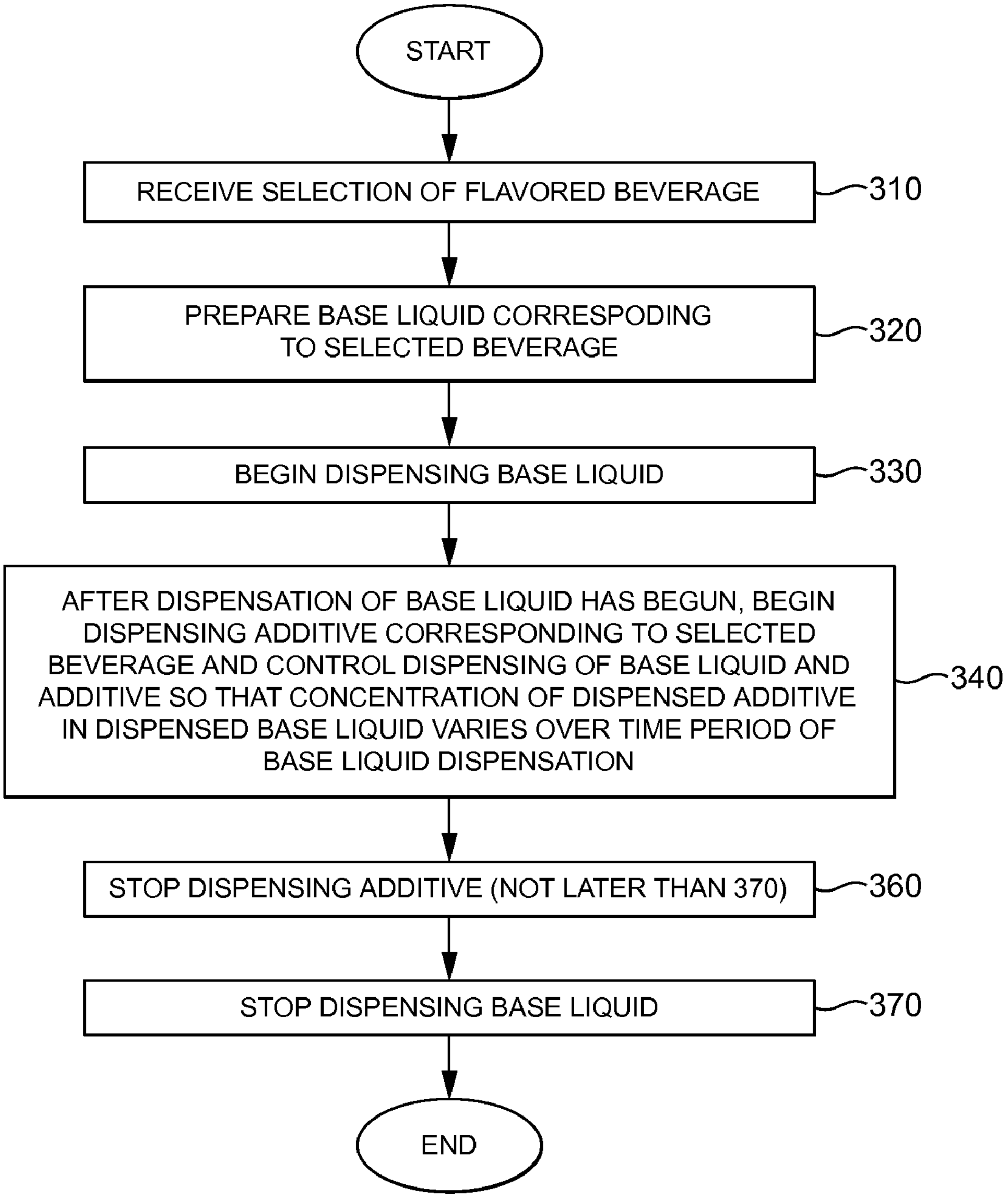

FIG. 3 schematically illustrates an embodiment of a method for preparing a flavored beverage with the dispensers shown and described with respect to FIGS. 1 and 2. As will be understood by those of ordinary skill in the art, the disclosed dispensing methods are not limited to the exemplary method shown in FIG. 3, can prepare beverages with dispensers different than those shown in FIGS. 1 and 2, and can prepare beverages based on features that are different than and/or additional to those shown in FIG. 3.

As shown in FIG. 3, a selection of a flavored beverage is received via, e.g., a user interface (310 in FIG. 3). Based on receiving the selection, controller 145 causes a base liquid corresponding to the selection to be prepared (320 in FIG. 3) and dispensed into container 150 (330 in FIG. 3).

In most embodiments, the base liquid is prepared by mixing one or more of the beverage components stored in storage chambers 102 with a liquid from liquid source 120. Preferably, at least one of the beverage components includes a flowable liquid concentrate. (In some embodiments, of course, the base liquid can include the liquid from liquid source 120 itself or, alternatively, one or more liquid beverage components which do not need to be mixed with the liquid from liquid source 120.) Usually, therefore, controller 145 prepares the base liquid by activating pumps 140 and/or other components so as to direct pre-determined amounts of the one or more beverage components and the liquid of liquid source 120 to blending mechanism 130 (e.g., mixing cup 170). In some embodiments, controller 145 prepares the base liquid at substantially an ambient temperature. Alternatively, in some embodiments, controller 145 prepares the base liquid by heating or cooling the liquid from liquid source 120 (i.e., by causing the liquid to pass through heating or cooling unit 121 or 123) prior to directing the liquid to blending mechanism 130. Cooling of the liquid from liquid source 120 can produce a relatively cold base liquid. Base liquids can be dispensed at less than about 50° C. for some beverages, and at less than about 40° C., 30° C., 25° C., or 20° C. for different types of beverages, or even below about 10° C. for cold beverages. Some beverage can be dispensed at room temperature, such as around or above 20° C., and others can be dispensed at heated temperatures, such as above 40° C. and more preferably above about 50° C.

After dispensation of the base liquid into container 150 has begun, controller 145 causes the additive or additives corresponding to the user's selected flavored beverage to be dispensed into container 150 by activating pumps 160 and controls the dispensing of the additive and the base liquid (i.e., controls pumps 140 and/or 160 and/or other components of dispenser 100) so that the concentration of the dispensed additive in the dispensed base liquid varies over the time period of the base liquid dispensation (340 in FIG. 3).

As previously described, the additive dispensation preferably begins after the starting time of the base liquid dispensation so as to facilitate mixing between the additive and the base liquid. While the additive dispensation can begin about from 0.5 seconds to 10 seconds after the starting time of the base liquid dispensation, the additive dispensation preferably begins at least 1 second after the starting time of the base liquid dispensation so as to enhance mixing. In most embodiments, the additive dispensation will begin about from 1 second to 3 seconds after the starting time of the base liquid dispensation.

The concentration of the dispensed additive in the dispensed base liquid preferably is between about 1:1000 to about 1:25 volume of additive-to-base liquid. Preferably, this concentration is from about 0.1 mL additive per 250 mL base liquid to as much as about 2 mL additive per 250 mL base liquid for coffee products, and from about 0.5 mL and 10 mL of additive per 250 mL base liquid in nutritional supplements or texture improving compounds. The actual concentration of additive in base liquid will depend on the types of additive and base liquid and beverage to be prepared and other factors known to those of ordinary skill in the art.

In some embodiments, controller 145 causes the additive to be dispensed continuously into container 150, i.e., dispensed in a continuous stream throughout the duration of additive dispensing. Controller 145 can be configured to continuously dispense the additive based on instructions that are stored in the storage media and/or instructions that are received from an user via a user interface (e.g., based on the "push and hold" operation previously described herein).

Alternatively, in some embodiments, controller 145 causes the additive to be dispensed intermittently or "pulsed" into container 150. Controller 145 can be configured to pulse the additive based on instructions that are stored in the storage media, e.g., instructions indicating a number of pulses, the duty cycle (i.e., ratio expressed as a percentage representing the ratio of the durations of each pulse to the total cycle time), the start time of pulsing relative to start time of base liquid dispensation, and the end time of pulsing relative to start time and/or end time of base liquid dispensation. In some "pulsed" embodiments, the dispensation of the base liquid can be paused during pulsing, i.e., can terminate prior to additive pulsing, and recommence after additive pulsing. Preferably, though, the base liquid is dispensed throughout additive pulsing so as to enhance mixing between the base liquid and the additive. Alternatively, controller 145 can cause the additive to be pulsed based on instructions that are received from a user via a user interface (e.g., based on the "push" operation previously described herein). In such embodiments, the features of the pulsing (e.g., number of pulses, durations, durations between, start times, duty cycle, and stop times) can be determined by the user inputs, such as the particular beverage and additive(s) selected.

Eventually, controller 145 causes the dispensation of the additive to terminate (360 in FIG. 3) and the dispensation of the base liquid to terminate (370 in FIG. 3). Generally, the controller controls the dispensation periods so that the base liquid is dispensed for a time period $T_1$ and the additive is dispensed for a time period $T_2$, in which time period $T_2$ commences after the start of time period $T_1$ and terminates not later than the termination of time period $T_1$. When the additive is pulsed, the time period $T_2$ represent the total additive dispense cycle time. Preferably, the additive dispensing terminates before the termination of the base liquid dispensing (i.e., the time period $T_2$ terminates before the termination of time period $T_1$) so as to enhance mixing between the additive and the base liquid and prevent or inhibit splashing of the additive from the surface of the dispensed beverage. To that end, in most embodiments, the additive dispensation will terminate within about 2 seconds of the termination of the base liquid dispensation. In some embodiments, the base liquid dispensation can be terminated at a time period (the "stopping time period") after the termination of the additive dispensing. The duration of that time period can be proportional to the additive dispensation time period $T_2$.

In some embodiments, controller 145 controls dispensation of the base liquid so that, during at least a portion of the period of that dispensation (preferably, during a terminal portion of that period), the base liquid is whipped by whipper 176 prior to being dispensed into container 150. For example, in some of such embodiments, controller 145 can cause the base liquid to be whipped by whipper 176 towards the end of the dispensation period of the base liquid so as to provide a layer of foam on the liquid beverage in container 150 (e.g., a layer of foam for a coffee beverage, such as a cappuccino or a latte). The whipping period can be based on instructions in the storage media and/or can be determined based on instructions received from an operator via a user interface.

As previously described, controller 145 can cause one or more additives to be dispensed into container 150 (340 in FIG. 3). In embodiments in which more than one additive is dispensed, controller 145 and/or a user via a user interface can control the dispensation features of each additive, e.g., the start time of dispensation, the end time of dispensation, etc. In one such embodiment, the start times and the end times at which two or more additives are dispensed overlap, so that the additives are dispensed simultaneously, thereby enhancing blending among the additives. In another embodiment, the start times and/or the end times can be different, so as to prevent or inhibit cross-contamination that could occur during simultaneous dispensation.

While the disclosed beverage dispensers and dispensing methods have been shown and described with reference to the illustrated embodiments, those of ordinary skill in the art will recognize and/or be able to ascertain many equivalents to those embodiments by using routine experimentation. Such equivalents are encompassed by the scope of the present disclosure and the appended claims.

For example, while the disclosed beverage dispensers have been described with respect to beverage components that are stored in "storage chambers" and "additives" that are stored in "containers," the disclosed beverage dispensers are not limited to such storage media and can be suitably modified so as to store the beverage components and/or the additives in other types of storage media, such as, but not limited to, bags, cartons, cylinders, hoppers, and the like. As such, references herein to storage chambers and containers are for convenience only, and are to be understood more generally as references to storage media for storing beverage components and additives.

Also for example, the disclosed beverage dispensers are not limited to storing the beverage components and/or the additives inside housing 182, but can be suitably modified to store one or more beverage components and/or one or more additives outside housing 182 and attached thereto and/or outside housing 182 and not attached thereto (e.g., at locations remote from the housing). Moreover, the disclosed beverage dispensers can be suitably modified to store the beverage components at locations inside the housing 182 that are different than those shown and described herein. Also for example, the disclosed beverage dispensers are not limited to the types and/or the arrangements of components shown in FIGS. 1 and 2 and can be suitably modified so as to provide the mixing features described herein with different types and/or different arrangements of components. Unless otherwise provided, when the articles "a" or "an" are used herein to modify a noun, they can be understood to include one or more than one of the modified noun.

EXAMPLE 1

Automatic Control of the Dosage Adjustment to the Beverage Strength and Number of Additives Dispensed The following table 1 gives an example of control specifications for the dispensing of one single additive for 240 mL beverages to obtain final beverage strengths of about, respectively, 0.3 mL ("low strength"), 0.4 mL ("medium strength") and 0.5 mL ("high strength") of additive in the beverage:

TABLE 1

| Number of additives | Additive Strength | Additive Volume per additive (in mL) | Additive dispensing time (in sec.) | Frequency (Pulse per sec.) | Additive Volume per pulse (in mL) | Duty Cycle (in %) |
|---|---|---|---|---|---|---|
| 1 | Low | 0.3 | 3.4 | 3 | 0.025 | 54 |
| | Medium | 0.4 | 4.7 | 3 | 0.03 | 54 |
| | High | 0.5 | 5.8 | 3 | 0.03 | 54 |
| 2 | Low | 0.15 | 2.6 | 2 | 0.03 | 66 |
| | Medium | 0.2 | 3.6 | 2 | 0.03 | 70 |
| | High | 0.25 | 4.1 | 2 | 0.032 | 40 |
| 3 | Low | 0.1 | 3.1 | 1 | 0.035 | 10 |
| | Medium | 0.133 | 4.1 | 1 | 0.035 | 10 |
| | High | 0.166 | 5.1 | 1 | 0.035 | 30 |
| 4* | Low | 0.075 | 3 (i.e., 0.9 sec. for each pair of pump with 1.1 sec. of pause) | 4 | 0.025 | 60 |
| | Medium | 0.1 | 3 (i.e., 1.5 sec for each pair) | 3 | 0.025 | 70 |
| | High | 0.125 | 3 (i.e., 1.5 sec for each pair) | 3 | 0.031 | 54 |

*When more than three additives are operated at the same time, the controller operates two pumps at the same time.

EXAMPLE 2

Beverage Dispense Control According to a Free Flow Mode

The free flow mode of beverage dispense refers to the ability for the user to control the volume of beverage which is dispensed. One possible way is to maintain a control switch pressed during the desired dispensing time and so to stop the beverage dispense at any time when the switch is released so that a control of the desired volume of the beverage is made possible. Other ways may exist such as repeated pressure on a switch to switch on and off the beverage base pump.

One aspect is to be able to deliver a correct amount of additive. A second aspect is to provide a properly mixed beverage with the additive(s) being sufficiently diluted in the beverage base.

Preferably, the pressure (e.g., either a constant or discrete pressure depending on the control system) on the switch by the user ensures, first, the actuation of the pump for the beverage base and, secondly, after a small delay the actuation of at least one of the additive dosing pumps.

In order to ensure the correct amount of additive dosed, the dispenser's control can dispense the additive at a rate proportional to the beverage dispense rate. The control of the free flow mode is set up to prompt the operator on site or the dispenser's manufacturer at the factory to enter the actual beverage volume ("V") in mL and the total dispense time for the beverage ("Z") in seconds (e.g., Z=3.4 sec.). The beverage base flow rate is so equal to V/Z.

For instance, for an additive that needs to be dispensed at a volume "X" of 0.3 mL per 240 mL ("V"), a minimum volume "v"=33 mL of beverage base is required before starting the additive dispense, the time required to dispense 33 mL of beverage base is equal to A=33/(V/Z) (i.e., about 0.46 seconds).

Therefore, a preferred sequence for delivering the beverage could be:

Step-A_: Start beverage base dispense at a time T=0 corresponding to user's input, Step-B: First actuation of the additive pump for one pulse at a time delay of A=(33/(V/Z)) second (i.e., 0.46 sec.), Step C—Subsequent actuation of the additive pump for at least one pulse at every time interval of (Z−2*A)/12 second (i.e., at about every 0.206 sec.), Step D—Last actuation of the additive pump for one last pump at a time delay of T=Z−A seconds (i.e., 2.94 sec.), Step E—Automatic stop the beverage base dispense at a time T=Z seconds (i.e., 3.4 sec).

It must be noted that step d- can be omitted in the sequence, however for a better mixing of the additive and more homogeneous beverage, the sequence should preferably include step d-. The sequence can be stopped by the user after step c- or d- as the actuation button is released before the delivery of the full volume of the beverage is achieved. In a preferred sequence, as the actuation button is released during step c-, step d- is carried out and the beverage base delivery is ended before step e-. This allows to ensure again a good mixing of the additive in the beverage.

As a matter of illustration, table 2 below provides the time interval, percentage duty cycle values and frequency up to four additives being dispensed during the beverage preparation:

TABLE 2

| Beverage volume "V" (in mL) | Beverage strength (in mL of additive) | Number of additives dispensed | Time interval between two pulses (in sec.) | Duty cycle (in %) | Frequency (Pulse/sec.) |
|---|---|---|---|---|---|
| 240 | 0.3 | 1 | (Z − 2*A)/12 | 54 | 3 |
| | 0.3 | 2 | (Z − 2*A)/6 | 54 | 3 |
| | 0.3 | 3 | (Z − 2*A)/3 | 10 | 1 |
| | 0.3 | 4 | (Z − 2*A)/3 | 54 | 3 |
| | 0.4 | 1 | (Z − 2*A)/16 | 54 | 3 |
| | 0.4 | 2 | (Z − 2*A)/8 | 54 | 3 |
| | 0.4 | 3 | (Z − 2*A)/4 | 10 | 1 |
| | 0.4 | 4 | (Z − 2*A)/4 | 54 | 3 |
| | 0.5 | 1 | (Z − 2*A)/20 | 54 | 3 |
| | 0.5 | 2 | (Z − 2*A)/10 | 54 | 3 |
| | 0.5 | 3 | (Z − 2*A)/5 | 10 | 1 |
| | 0.5 | 4 | (Z − 2*A)/5 | 54 | 3 |

Time interval specifies the amount of time elapsed between two consecutive actuations of the additive pump for one additive only. Therefore, when two additives or respectively, three additives, are dosed, each additive pump may be actuated sequentially at a less frequent interval since the amount of each additive is two or, respectively, three times lower in the beverage. For instance, if an equal amount of each additive is required in the beverage, when two additives are dosed as illustrated in Table 2, the time interval between two consecutive pulses of the same additive pump can be two times longer. For instance, if an equal amount of each additive is required in the beverage, when three additives are dosed, the time interval between two consecutive pulses of the same additive pump can be three times longer.

Of course, the time interval for each additive pump depends on the number of additives dosed and the dose of each additive desired in the beverage. The ratio of the additives may differ from an equal distribution amongst the additives and the time interval for delivering each additive may vary from one additive to another.

The invention claimed is:

1. A method of preparing a beverage, comprising:

mixing a fluid concentrate beverage component with a first liquid to provide a base liquid;

dispensing the base liquid from a dispensing device into a container;

dosing and dispensing a flowable additive from the dispensing device into the container to mix the flowable additive with the base liquid during the dispensing of the base liquid to provide a beverage;

controlling the dispensing of the base liquid and additive to vary a relative concentration of the additive in the base liquid in the container during the dispensing, wherein the dispensing of the additive begins after the dispensing of the base liquid starts;

stopping the dispensing of the flowable additive; and stopping the dispensing of the base liquid substantially no earlier than when the dispensing of the flowable additive is stopped, wherein the additive is dispensed in a plurality of pulses of predetermined durations, the base liquid being dispensed at least before and at the beginning of the pulses, and wherein the dispensing of the beverage is controlled by the following sequence:

starting the dispense of the beverage base at a starting time T=0, starting pulsing the additive at a time delay A in seconds from a starting time T=0 corresponding to formula:

$$A=v/(V/Z)$$

where volume "v" is a minimum volume of beverage base needed before pulsing the additive, V is an actual beverage volume and Z is a total dispensing time for the beverage in seconds, pulsing the additive at every time interval corresponding to a formula:

$$\text{time interval}=(Z-2.A)/n,$$

where n is total number of pulses necessary for delivering X mL of additive in the beverage obtained by a formula:

$$n=X/q$$

where q is a quantity of additive delivered by the additive dosing device per pulse, and ending dispensing of the beverage base at a time delay of T=Z.

2. The method of claim 1, wherein the dispensing of the base liquid is stopped after the dispensing of the flowable additive is stopped for varying the additive relative concentration in the base liquid after the additive dispensing is stopped, the method further comprising mixing a final dispensed amount of the additive with the base liquid.

3. The method of claim 2, wherein the dispensing of the base liquid is stopped after a stopping time period after stopping the dispensing of the additive, the stopping time period is proportional to a duration of the additive dispensing.

4. The method of claim 2, comprising operating a dispensing control to stop the dispensing of the base liquid and additive, the base liquid is automatically dispensed for a predetermined period longer than the additive after the dispensing control is operated.

5. The method of claim 1, comprising dispensing the base liquid and additive for predetermined time periods automatically in response to operating a dispensing control.

6. The method of claim 1, wherein the base liquid is dispensed after a stopping of the pulses.

7. The method of claim 1, wherein, the additive is dispensed during a period which increases relative to the size of the beverage to be dispensed.

8. The method of claim 7, wherein the additive is dispensed following the steps of:

a—obtaining preference information from a dispensing control of the dispensing device relative to a desired size "V" of the beverage among a choice of different sizes of beverages, b—controlling the dispensing device to dispense the additive during a cycle time "Y" of the additive in a manner which is relative to the size of the beverage.

9. The method of claim 7, wherein the additive is dispensed following the steps of:

a—obtaining preference information from a dispensing control of the dispensing device relative to a desired size "V" of the beverage among a choice of different sizes of beverages, b—obtaining preference information from a dispensing control of the dispensing device relative to the desired additive strength "X" for one size among a choice of additive strengths and, c—controlling the dispensing device to dispense the additive during a cycle time "Y" of the additive in a manner which is relative to the size of the beverage and also relative to the chosen strength "X".

10. The method of claim 1, wherein, the additive is dispensed during a period which increases relative to the strength of the beverage to be dispensed.

11. The method of claim 1, further comprising operating a dispensing control of the dispensing device to conduct a series of said pulses.

12. The method of claim 11, wherein the series of pulses is stopped in response to operating the dispensing control.

13. The method of claim 1, wherein the dispensing of the base liquid begins at least about 1 second before beginning the dispensing of the additive.

14. The method of claim 1, comprising operating a selection control of the dispensing device to select at least one of the additive sources from which to dispense the additive.

15. The method of claim 1, wherein the additive comprises at least one selected from the group consisting of: a flavoring, a nutritional supplement, a coffee or tea boost, a sweetener, a flavor enhancer or reducer, a colorant, an aromatic, and a substance formulated to add body to the liquid base.

16. The method of claim 1, wherein the beverage component is selected from the group consisting of a protein-enriched liquid, juice, coffee, tea, cocoa, milk, a cereal, and a combination thereof.

17. The method of claim 16, wherein the beverage component comprises at least one component selected from the group consisting of a coffee, cocoa, tea base, a sweetener, and a whitener.

18. The method of claim 17, wherein the whitener comprises a non-dairy creamer.

19. The method of claim 17, wherein the whitener comprises a dairy creamer comprising milk solids.

20. The method of claim 1, wherein the additive is mixed in the base liquid in a relative concentration from about 1:1000 to about 1:25 volume of base additive to base liquid.

21. The method of claim 1, wherein the base liquid is dispensed at least about 50° C.

22. The method of claim 1, wherein the base liquid is dispensed at a temperature that is less than about 50° C.

23. A method of preparing a beverage, comprising:

dispensing a base liquid from a dispensing device into a container at a temperature that is less than about 50° C., wherein the base liquid comprises a protein, a milk based component, fat, carbohydrates, a nondairy whitener, or a mixture thereof;

dispensing a flowable additive from the dispensing device into the container to mix the flowable additive with the base liquid during the dispensing of the base liquid to provide a beverage;

controlling the dispensing of the base liquid and additive to vary the relative concentration of the additive in the base liquid in the container during the dispensing, wherein the dispensing of the additive begins after the dispensing of the base liquid starts;

stopping the dispensing of the flowable additive; and stopping the dispensing of the base liquid substantially no earlier than when the dispensing of the flowable additive is stopped, wherein the additive is dispensed in a plurality of pulses of predetermined durations, the base liquid being dispensed at least before and at the beginning of the pulses, and wherein the dispensing of the beverage is controlled by the following sequence:

starting the dispense of the beverage base at a starting time T=0, starting pulsing the additive at a time delay A in seconds from a starting time T=0 corresponding to formula:

$$A=v/(V/Z)$$

where volume "v" is a minimum volume of beverage base needed before pulsing the additive, V is an actual beverage volume and Z is a total dispensing time for the beverage in seconds, pulsing the additive at every time interval corresponding to a formula:

$$\text{time interval}=(Z-2.A)/n,$$

where n is total number of pulses necessary for delivering X mL of additive in the beverage obtained by a formula:

$$n=X/q$$

where q is a quantity of additive delivered by the additive dosing device per pulse, and ending dispensing of the beverage base at a time delay of T=Z.

* * * * *